(12) United States Patent
Chang

(10) Patent No.: US 6,481,860 B1
(45) Date of Patent: Nov. 19, 2002

(54) CIRCULAR OPTICAL REFLECTION APPARATUS

(75) Inventor: Y. W. Chang, MiaoLi (TW)

(73) Assignee: Umax Data Systems Inc (TW)

( * ) Notice: Subject to any disclaimer, the term of this patent is extended or adjusted under 35 U.S.C. 154(b) by 0 days.

(21) Appl. No.: 09/690,319

(22) Filed: Oct. 17, 2000

(30) Foreign Application Priority Data

Feb. 2, 2000 (TW) .......................... 89101769 A

(51) Int. Cl.⁷ .................... G02B 5/10; G02B 26/08; H04N 1/04
(52) U.S. Cl. ............ 359/867; 250/227.2; 250/227.26; 358/474; 358/480; 358/482; 358/505; 358/509; 358/513
(58) Field of Search ............... 359/857, 861, 359/867, 212; 358/505, 506, 509, 513, 474, 480, 482, 493; 250/227.2, 227.26, 228

(56) References Cited

U.S. PATENT DOCUMENTS

| | | | |
|---|---|---|---|
| 3,675,985 A | * | 7/1972 | Gloge |
| 3,994,603 A | * | 11/1976 | Paschedag |
| 4,128,308 A | * | 12/1978 | McNaney |
| 4,264,135 A | * | 4/1981 | Lang |
| 4,344,671 A | * | 8/1982 | Lang |
| 4,710,624 A | * | 12/1987 | Alvarez et al. |
| 4,797,711 A | * | 1/1989 | Sasada et al. |
| 4,864,134 A | * | 9/1989 | Hosoi et al. |
| 4,868,383 A | * | 9/1989 | Kurtz et al. |
| 5,173,749 A | * | 12/1992 | Tell et al. |
| 5,274,228 A | * | 12/1993 | Kaplan |
| 5,598,008 A | * | 1/1997 | Livoni |
| 5,804,818 A | * | 9/1998 | Kaplan |
| 5,810,463 A | * | 9/1998 | Kawahara et al. |
| 5,835,231 A | * | 11/1998 | Pipino |

FOREIGN PATENT DOCUMENTS

SU 873197 * 10/1981

* cited by examiner

Primary Examiner—Ricky D. Shafer

(57) ABSTRACT

A circular optical reflection apparatus to be used in an optical image capturing device for receiving light ray from a light source and reflecting the light ray at least twice inside the apparatus then projecting the light ray to a lens set for forming an image on an image forming device. The apparatus includes a cylindrical optical member which has its outside surface coating with a reflective material and has an axial cutaway section to serve as a light inlet and a light outlet. Light ray enters through the light inlet into the cylindrical optical member and reflects inside at least twice then emits out through the light outlet. It may obtain an optical path needed for image forming with less number of reflection mirrors. It is smaller size and may be produced and assembled with less time and cost. It can also eliminate accumulated reflection angle tolerance that might otherwise happen to the conventional ones that use reflection mirrors.

12 Claims, 5 Drawing Sheets

CIRCULAR OPTICAL REFLECTION APPARATUS

CIRCULAR OPTICAL REFLECTION APPARATUS

1. Field of the Invention

This invention relates to a circular optical reflection apparatus and particularly to a circular optical reflection apparatus for scanner, copier, fax machine and the like that uses light reflecting to get required light path for forming desired image.

2. Background of the Invention

Optical devices such as scanner, copier, high resolution fax machine or camera and video camera usually have an optical means to capture an object image. In to principle, a light source emits light ray which is projected to the object. Light ray then reflects from or passes through the object and being directed to a lens to form a light image on an image forming means such as a charged couple device (CCD) or negative film.

In the aforesaid process, it needs an optical path means to direct light ray for a number of reflection or refraction to get a desired light distance (or also referred as TT; Total Track of light path) for forming a good quality image through the lens.

FIG. 1 shows a conventional reflection optical scanner 1 which has a light source 10 emitting light ray to an object (not shown in the picture) laid on a document board 11. Light reflects from the object and enters an optical reflection means 12 which reflects light a number of times to reach a desired optical path then projects light ray to a lens set 13 which in turn forms an object image on a CCD 14. There is a transmission means 15 to move the light source 10 and optical reflection means 12 along a guide rail 16 for scanning the object.

FIG. 2 shows a conventional optical reflection means which includes a plurality of independent reflection mirrors 21 and 22 fixedly located in the optical reflection means with selected relative angles. Incident light may travel into the optical reflection means and reflect among the reflection mirrors 21 and 22 to get a desired optical path. In practice, the optical reflection means usually needs three or four reflection mirrors. Each mirror has a unique position and angle. A slight deviation or error of the position or angle, particularly for the first reflection mirror 21, may result in poor final image quality.

Each reflection mirror has a tolerance in the position and angle that allows the deviation within an acceptable range. However that tolerance will be accumulated after light travels among the reflecting mirrors. The accumulated tolerance could become so large and makes final image quality become very poor.

Many optical devices such as scanners need a relative long optical path. It means the reflection mirrors should be organized with relative large distance among each other. The size of the optical means thus become bulky and heavy. It is against the contemporary trend which highly values compact size and light weight. Another It alternative is trying to reduce size by increase reflection mirror number. Then the weight of the optical means will be increased. Furthermore arrangement of position and angle for a greater number of mirrors becomes even more difficult and time consuming. Accumulated tolerance effect becomes even more worse. Light intensity diminishing effect after reflecting among multiple mirrors become more severe. All of this have negative impact on image quality.

FIG. 3 shows another prior art which uses a polygonal prism reflection means which includes a polygonal prism 31 which has side planes 32, 33, 34, 35 and 36 formed with selected angles therebetween. Side planes 33 and 35 are coated by reflective material 331 and 351 respectively so that they become reflective planes. Side planes 32, 34 and 36 remain transparent. An incident light projects to the prism 31 through the plane 32 normally and being reflected by the plane 33, 35 and being exit through the plane 36. Hence one prism may replace multiple number of reflection mirrors to obtain a required optical path.

However the prism reflection means has drawbacks. There will be unavoidable tolerance when producing the side planes 32, 33, 34, 35 and 36, and consequently will create accumulated tolerance. It will adversely affect image quality especially when the first reflection plane 33 has relatively large tolerance. Furthermore once made, the positional and angular relationship among the planes cannot be changed or adjusted like the mirrors. Its optical path is fixed and unadjustable. Its application is very limited. Different prism should be made for different device or application, and cannot be modularly produced or interchanged. It thus adds a lot of problems and restriction in product design, production and inventory control and management.

SUMMARY OF THE INVENTION

In view of aforesaid disadvantages, it is therefore an object of this invention to provide a circular optical reflection apparatus that can greatly reduce reflection mirror number to attain an required optical path with less reflecting angle accumulated tolerance and less component number for reducing cost and product size.

It is another object of this invention to provide a circular optical reflection apparatus in which one circular optical means may produce different optical path by adjusting its position related to incident light direction. Hence one circular optical means may suit for different type and size of optical devices. Product design and development cost may be greatly reduced. Component inventory cost may also become lower.

The circular optical reflection apparatus according to this invention includes a cylindrical reflection member coated with a reflection material on the external surface. The cylindrical reflection member has an axial indent cutaway section to receive and exit light. Incident light entered into the cylindrical means will be reflected inside for a number of times until a desired optical path is reached then be exited for the follow on usage.

BRIEF DESCRIPTION OF THE DRAWINGS

The invention, as well as its many advantages, may be further understood by the following tailed description and drawings in which.

DETAILED DESCRIPTION OF THE PREFERRED EMBODIMENT

This invention may be used in optical devices that need an optical means to produce an optical path for converting a captured object image to a light image, such as scanner, copier, fax machine, digital camera, camcorder, video camera and the like. The following description will take scanner as an embodiment example.

Figure 1:
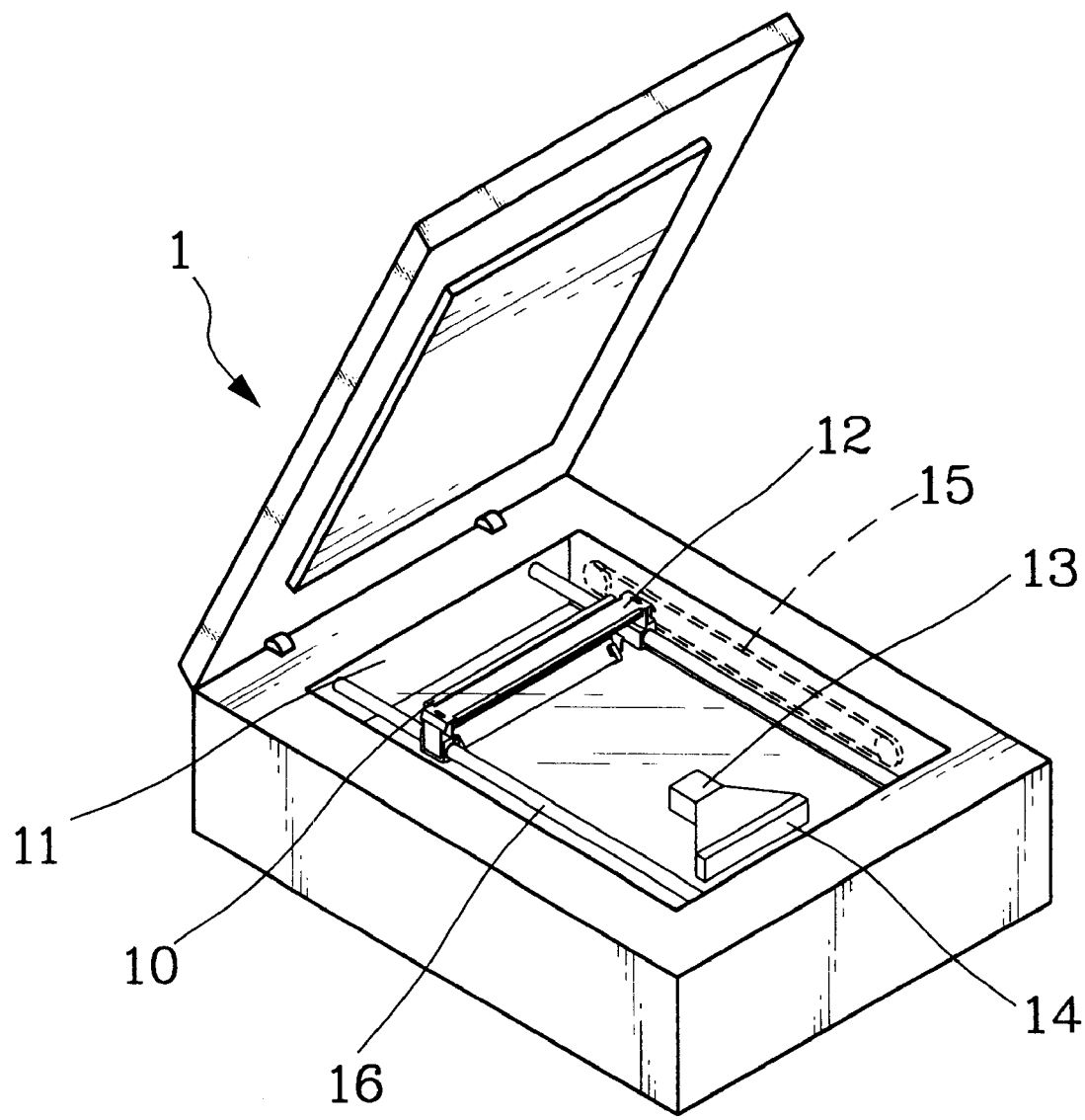
FIG. 1 is a pictorial view of a conventional reflective optical device.
Figure 3:
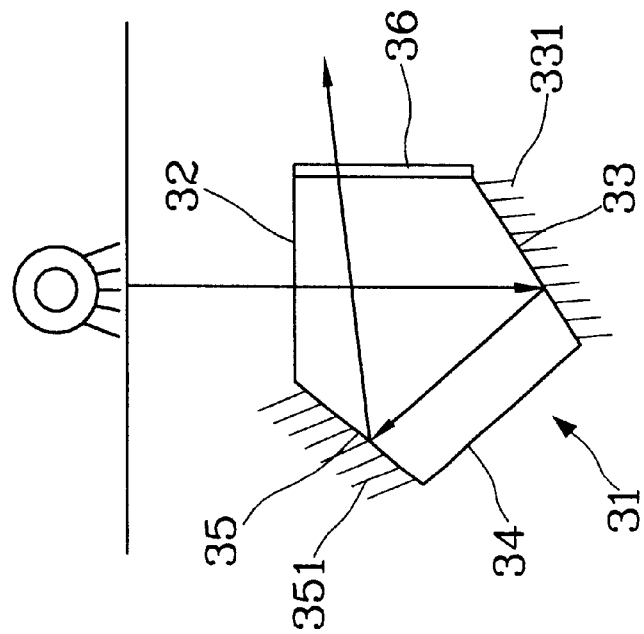
FIG. 3 is a schematic view of another conventional optical reflection means.
Figure 2:
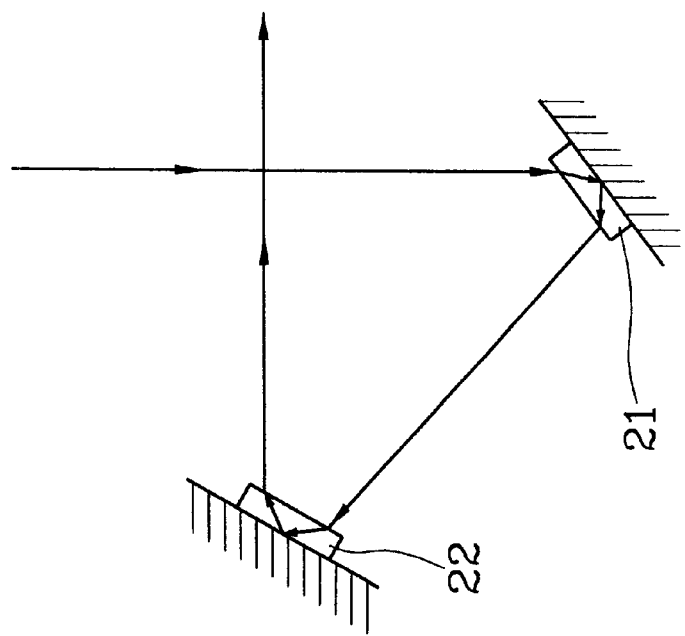
FIG. 2 is a schematic view of a conventional optical reflection means.
Figure 4:
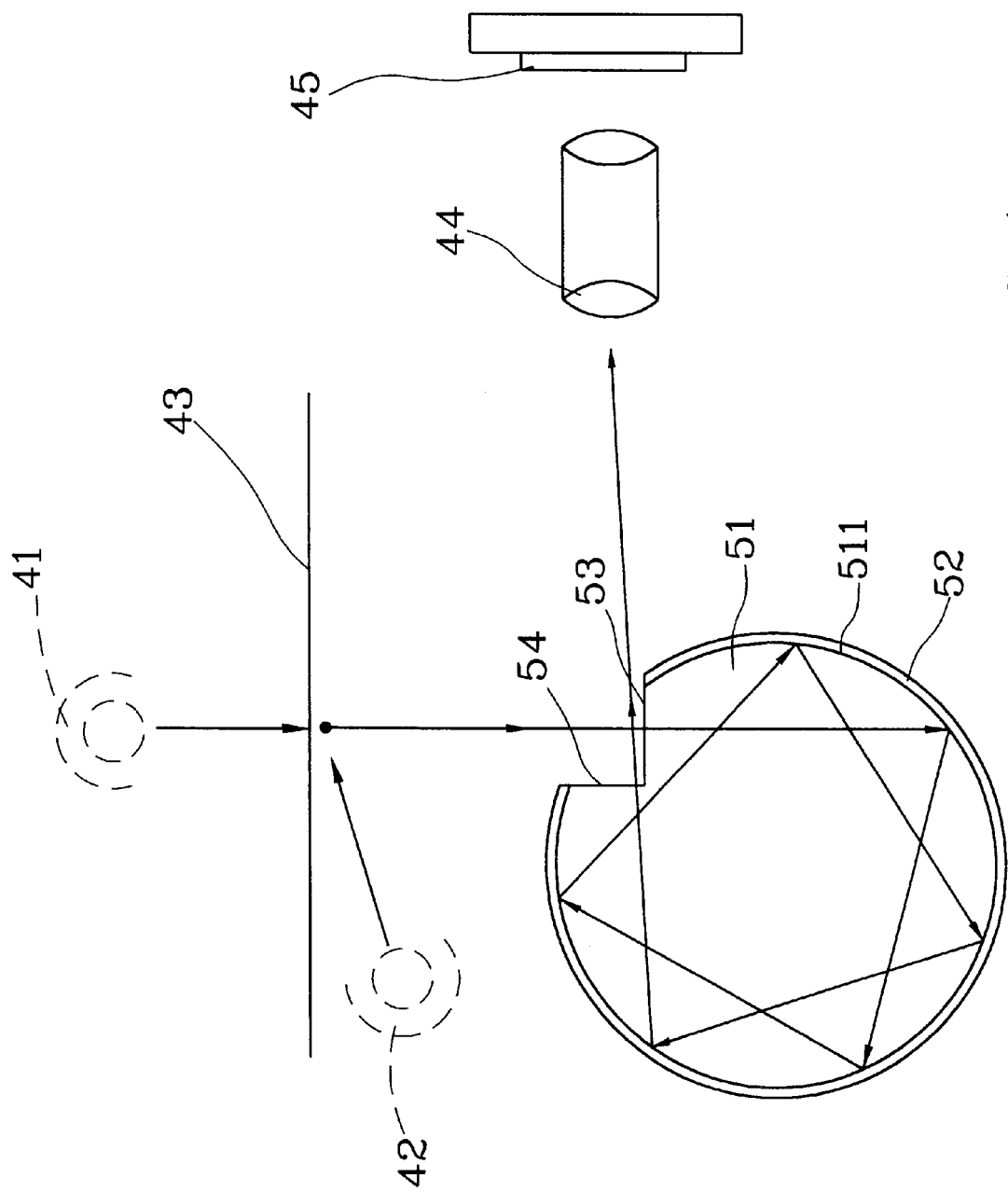
FIG. 4 is a schematic view of an embodiment of this invention.

Referring to FIG. 4, the circular optical reflection apparatus according to this invention includes a transparent cylindrical reflection member 51 made of glass, acrylic, crystal, plastics and the like. Its outside circumference surface is coated with reflective material 52 so that the inside surface of the circumference becomes a reflective surface 511. At a selected location at the circumference, a L-shaped indent cutaway section is formed in the crosssection axially to form a light inlet 53 and a light outlet 54.

A scanning document (not shown in the figure) may be placed on a document board 43. A lower light source 42 projects light ray to the document (an opaque one in such a case) and reflects the document image to become incident light. Incident light enters into the cylindrical reflection member 51 through the light inlet 53, reflected by the reflective surface 511 at different spots of the inside circumference until a desired optical length is reached, becomes an outgoing height emitted out through the light outlet 54 to project upon a lens 44 which condenses the outgoing light to form an image on an image capturing means 45 (such as a CCD).

The light inlet 53 and light outlet 54 may form an angle depends on the optical device design consideration. Generally, it is preferably to have the outgoing light normal to the incident light.

The incident light enters into the cylindrical reflection member 51 and hits the reflective surface 511 at a selected positive incident angle. The reflective light will have a reflective angle which is same as the incident angle but at a negative value (i.e., at different direction) to form a contained angle. Once the contained angle is available, by the known optical principle, the number of reflection within the cylindrical reflection member may be calculated and derived by means of mathematical formula when diameter of the reflection member and angle of incident light are given. With known parameters such as diameter, circle center and reflection number and incident light angle, total optical path may be calculated and obtained. The calculation may be done by computer simulation to obtain an optimal result for a given conduction or requirements. The optical principle and computer simulation process are known in the art and form no part of this invention, and will be omitted herein.

In addition to the computer simulation set forth above, the size and angle of light inlet 53 and light outlet 54 will also affect the final optical path. These factors should also be taken into account in the design and computer simulation.

By means of this invention, a single and simple cylindrical reflection member an replace multiple number of reflection mirrors or an irregular shape prism. It is less costly to produce and assemble, smaller size and less weight. Furthermore this invention provides a single homogenous reflective surface 511 and does not have tolerance accumulation problem that might otherwise happen to the mirrors or prism type optical means. This invention thus may produce a better quality image and obtain improved scanning result.

Moreover, by turning the cylindrical reflection member for a selected angle to change the incident light angle, different optical path may be obtained. Hence one size of cylindrical reflection member may be used for producing different type or size of optical devices. It greatly improves design and production flexibility and reduces production and material costs as well.

Even in the case of minor variation or tolerance of the cylindrical reflection member, it may be compensated or corrected by adjusting the cylindrical reflection member angle to the incident light. This is an extra advantage of this invention that can reduce material cost and enhancing production flexibility.

While the aforesaid embodiment uses a lower light source 42 to project an opaque object laid on the document board 43 to produce reflecting incident light, it can be used equally well for scanning a transparent object. In such a case, an upper light source 41 above the object and document board 43 will be used to project light upon and pass through the object to produce incident light. More embodiments of this invention are offered in the following. Similar component will be marked by similar numerals affixed with an alphabet.

Figure 5:
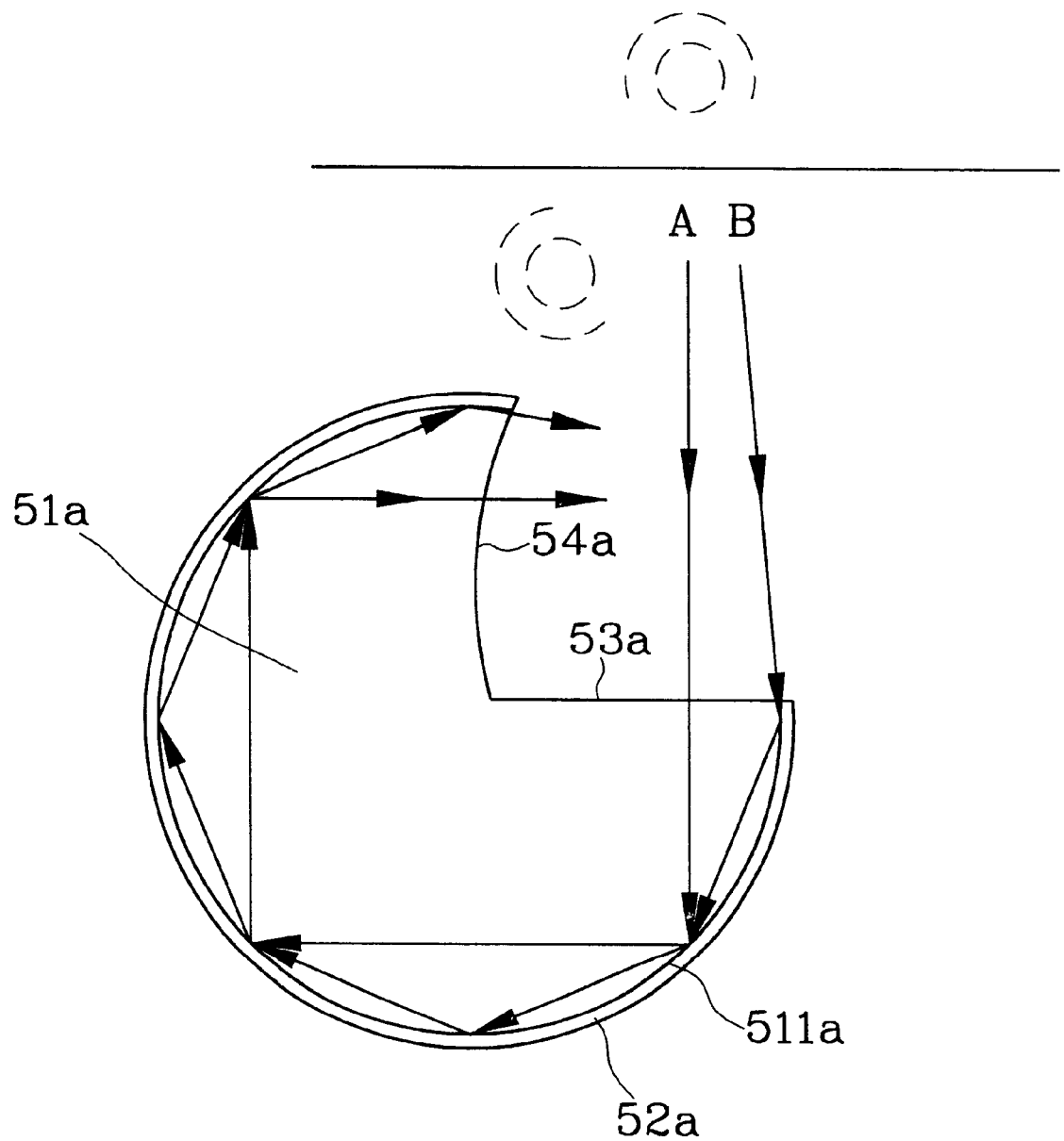
FIG. 5 is a schematic view of another embodiment of this invention.

FIG. 5 shows another embodiment of this invention. It is largely constructed like the one shown in FIG. 4. However it has a cured light outlet 54a which may help to keep exit light ray normal to the outlet source to reduce light scattering loss and to direct exit light ray through a proper light refraction angle to project on the lens the elements 51a, 52a, 53a and 511a in FIG. 5 can be the same as the elements 51, 52, 53 and 511, respectively, in FIG. 4 (not shown in the figure).

FIG. 5 also shows two incident lights of different angles for producing two different optical paths by applying the same circular optical reflection apparatus.

Figure 6:
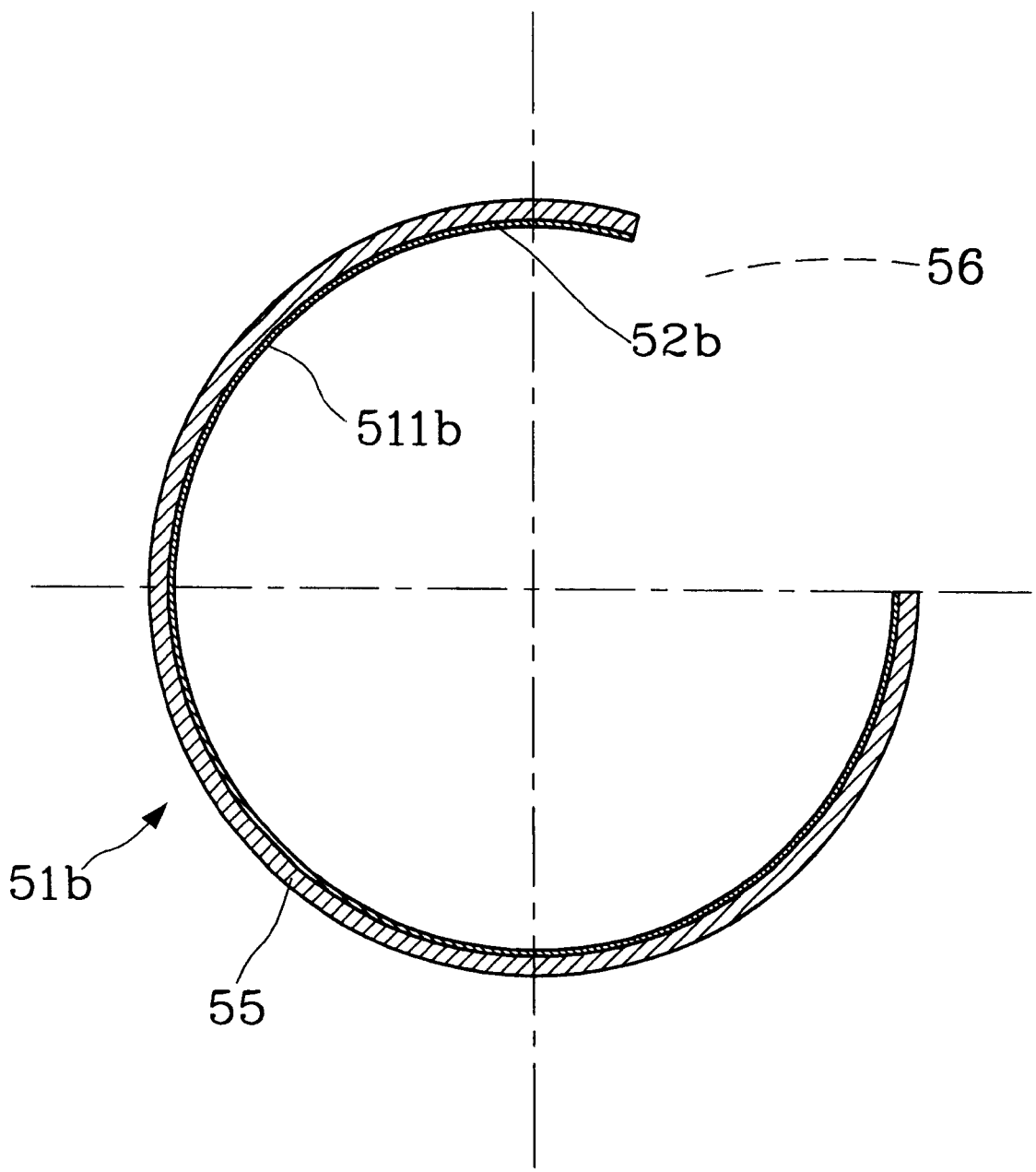
FIG. 6 is a schematic view of a further embodiment of this invention.

FIG. 6 shows yet another embodiment. The cylindrical reflection member 51b is a hollow tube type element 55 with an inside circumference surface coated with a reflective material 52b to form a reflective surface 511b. There is a cut away opening 56 at the circumference to serve as light inlet and outlet. It may function equally well as the embodiment described above.

It may thus be seen that the objects of the present invention set forth herein, as well as those made apparent from the foregoing description, are efficiently attained. While the preferred embodiments of the invention have been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A circular optical reflection apparatus for receiving light ray from a light source, reflecting the light ray and projecting the light ray to a selected direction, comprising:

a cylindrical reflection member having a surface which is coated with a reflective material, an axial light inlet for receiving the light ray into the cylindrical reflection member for the light ray to reflect inside the cylindrical reflection member, and an axial light outlet for the reflecting light ray to exit from the cylindrical reflection member, wherein the cylindrical reflection member is a transparent solid member and has an outside surface, and the reflective material is coated on the outside surface, and wherein the cylindrical reflection member has an axial L-shaped indent cutaway section having two adjacent sides, with one side being the light inlet and the other side being the light outlet.

2. The circular optical reflection apparatus of claim 1, wherein the circular optical reflection apparatus is located in an optical image capturing means.

3. The circular optical reflection apparatus of claim 1, wherein the cylindrical reflection member is made of glass.

4. The circular optical reflection apparatus of claim 1, wherein the cylindrical reflection member is made of acrylic.

5. The circular optical reflection apparatus of claim 1, wherein the two adjacent sides are substantially normal to each other.

6. The circular optical reflection apparatus of claim 1, wherein the light outlet is a curved surface.

7. A circular optical reflection apparatus located in an optical image capturing means which includes a light source, a lens and an image forming means, the light source emitting a light ray into the circular optical reflection apparatus for reflecting at least once and projecting the light ray to the lens for producing an image on the image forming means, wherein the circular optical reflection apparatus includes a cylindrical reflection member having a surface coating with a reflective material, and an axial cutaway section for receiving the light ray which is reflected at least once inside the cylindrical reflection member before being emitted out of the cylindrical reflection member through the cutaway section, wherein the cylindrical reflection member is a transparent solid member and has an outside surface, and the reflective material is coated on the outside surface, and wherein the cutaway section has an axial L-shape that has two adjacent sides, with one side being a light inlet and the other side being a light outlet.

8. The circular optical reflection apparatus of claim 7, wherein the optical image capturing means is a scanner.

9. The circular optical reflection apparatus of claim 7, wherein the optical image capturing means is a copier.

10. The circular optical reflection apparatus of claim 7, wherein the cylindrical reflection member is made of glass.

11. The circular optical reflection apparatus of claim 7, wherein the cylindrical reflection member is made of acrylic.

12. The circular optical reflection apparatus of claim 7, wherein the two adjacent sides are substantially normal to each other.

* * * * *